United States Patent [19]

Iizuka

[11] Patent Number: 4,666,259
[45] Date of Patent: May 19, 1987

[54] CATADIOPTRIC TELEPHOTO LENS

[75] Inventor: Yutaka Iizuka, Fujisawa, Japan

[73] Assignee: Nippon Kogaku K.K., Tokyo, Japan

[21] Appl. No.: 705,721

[22] Filed: Feb. 26, 1985

[30] Foreign Application Priority Data

Mar. 1, 1984 [JP] Japan .................................. 59-39268

[51] Int. Cl.$^4$ ............................................. G02B 17/08
[52] U.S. Cl. .................................................... 350/444
[58] Field of Search ......................................... 350/444

[56] References Cited

U.S. PATENT DOCUMENTS 3,632,190 1/1972 Shimizu .
4,188,091 2/1980 Fujii .
4,264,136 4/1981 Ogino .................................. 350/444

Primary Examiner—John K. Corbin
Assistant Examiner—Rebecca D. Gass
Attorney, Agent, or Firm—Shapiro and Shapiro

[57] ABSTRACT

A catadioptric telephoto lens comprises, in the order of processing of light from the object side, a biconvex positive lens component, a first reflecting member, a second reflecting member and a negative lens group. The first reflecting member has a refracting surface concave to the object side and a rear reflecting surface also concave to the object side and is capable of reflecting and converging the light. The second reflecting member is positioned close to and at the image side of said biconvex positive lens component and has a refracting surface convex to the image side and a rear reflecting surface also convex to the image side and is capable of reflecting and diverging the light. The negative lens group is positioned close to said first reflecting member and has at least a positive lens and a negative lens with a synthesized negative refractive power.

13 Claims, 6 Drawing Figures

CATADIOPTRIC TELEPHOTO LENS

BACKGROUND OF THE INVENTION

1. Field of the Invention

The present invention relates to a cataptric telephoto lens, and more particularly to a catadioptric telephoto lens.

2. Description of the Prior Art

A catadioptric telephoto lens is generally composed of four components; first being a positive lens member positioned in the front most part of the lens system for converging the incident light beam; second being a similarly converging main mirror member positioned with a large air gap in the image field side of the first positive lens member; third being a diverging subsidiary mirror member positioned in the vicinity of the first positive lens member; and fourth being a diverging negative lens group positioned in the vicinity of the main mirror member. Such structure is being widely employed because of various advantages such as a small total and a reduced color aberration.

Such conventional catadioptric telephoto lens is disclosed for example in the U.S. Pat. No. 3,632,190 corresponding to the Japanese Patent Publication No. 1909/1972, the Japanese Patent Publication No. 30288/1979, and the U.S. Pat. No. 4,188,091 corresponding to the Japanese Patent Laid-open No. 13183/1978. Though such lens is far shorter than the dioptric telephoto lenses, it is not yet satisfactory as the total length from the frontmost lens surface to the focal plane is larger than 30% of the focal length and the shortest focusable distance is larger than 8 times of the focal length.

The Japanese Patent Laid-open No. 38520/1980 discloses a structure allowing reduction of the entire length to 28% of the focal length by positioning a subsidiary mirror member at the object side of the positive lens member. However, the mirror member is generally supported by adhesion to the positive lens member. Consequently, the lens surface of the positive lens member, though transmitting the light beam twice through the reflection on said subsidiary mirror member, cannot be designed independently and has a reduced freedom for correcting the aberrations so that it often becomes difficult to achieve satisfactory correction. The subsidiary mirror member receives the converging light beam from the main mirror member, while an annular light beam entering the positive lens member passes around said subsidiary mirror member, so that a shielding tube has to be provided around said mirror member for dividing said light beams and preventing flare formation by the direct entry to the image plane of the light beam entering the positive lens member. However, the positioning of said shield tube becomes difficult when the subsidiary mirror member is provided at the object side of the positive lens member, so that the elimination of ghost light becomes difficult. In addition, when the subsidiary mirror member is positioned in front of the positive lens member, it is difficult to protect the subsidiary mirror member from external shock, so that the lens becomes less durable.

SUMMARY OF THE INVENTION

The object of the present invention is to provide a catadioptric telephoto lens which has an extremely short entire length from the frontmost lens surface to the focal plane, is of a small, light and sturdy structure free from ghost light, and still has a small shortest focusable distance and an excellent imaging performance.

The catadioptric telephoto lens of the present invention is featured by a structure composed, as shown in FIGS. 1 and 2, in the order from the object side, of a biconvex positive lens component L1; a first reflecting member M1 having a refractive surface concave to the object side and a rear reflective surface which is also concave to the object side and convergingly reflects the light; a second reflecting member M2 positioned on the optical axis at the image side in the vicinity of said biconvex positive lens component and having a light refracting surface convex to the image side and a rear reflecting surface which is also convex to the image side and divergingly reflects the light beam; and a negative lens group L2 positioned on the optical axis in the vicinity of said first reflecting member and having at least a positive lens and a negative lens showing a synthesized negative refractive power.

In such a structure wherein the second reflecting member M2, functioning as the subsidiary mirror member, is positioned at the image side of the biconvex lens component L1, the second reflecting member M2 and the biconvex lens component L1 can have mutually independent surfaces, so that the freedom of correction is widened to attain improved performance at the infinite distance and at a short distance. It is also rendered possible to easily install a shield tube for separating the annular light beam entering the biconvex positive lens component L1 from the light beam entering the second reflecting member M2 from the first reflecting member M1, so that ghost light can be sufficiently removed. In addition, as the subsidiary mirror is positioned inside the lens tube, the lens becomes stronger with respect to external shock.

DETAILED DESCRIPTION OF THE PREFERRED EMBODIMENTS

Figure 1:
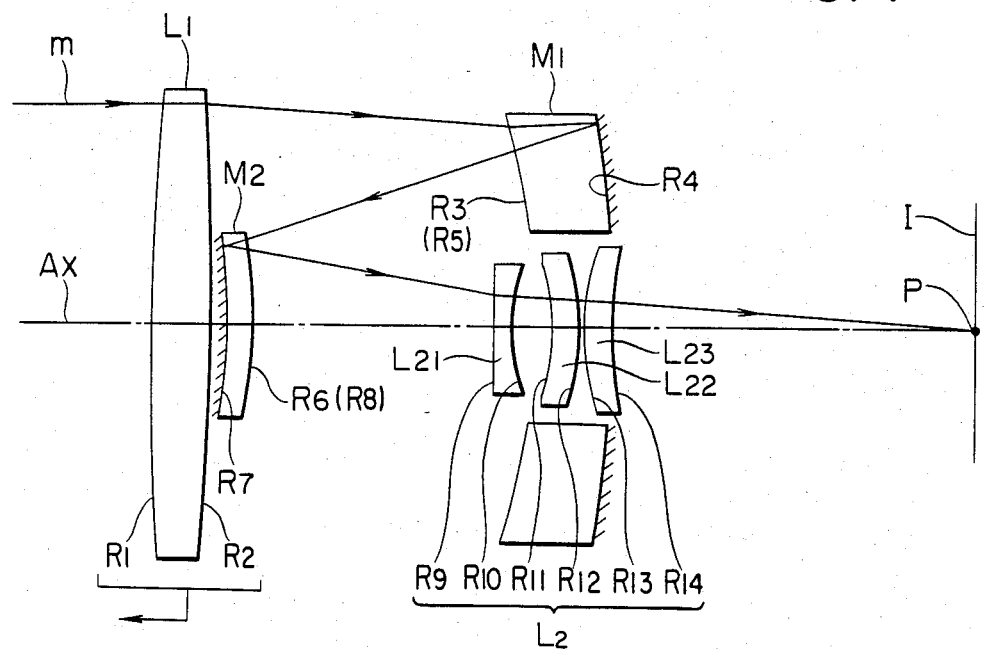
FIG. 1 is a lens structure diagram showing a first embodiment of the catadioptric telephoto lens of the present invention.
Figure 2:
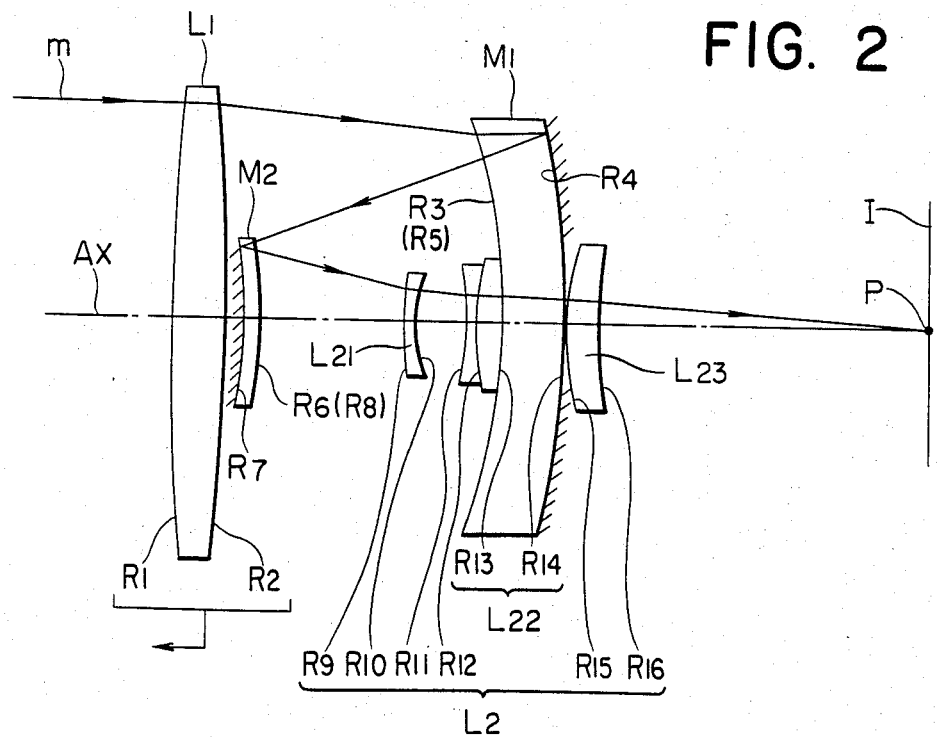
FIG. 2 is a lens structure diagram showing a second embodiment.
Figure 3A:
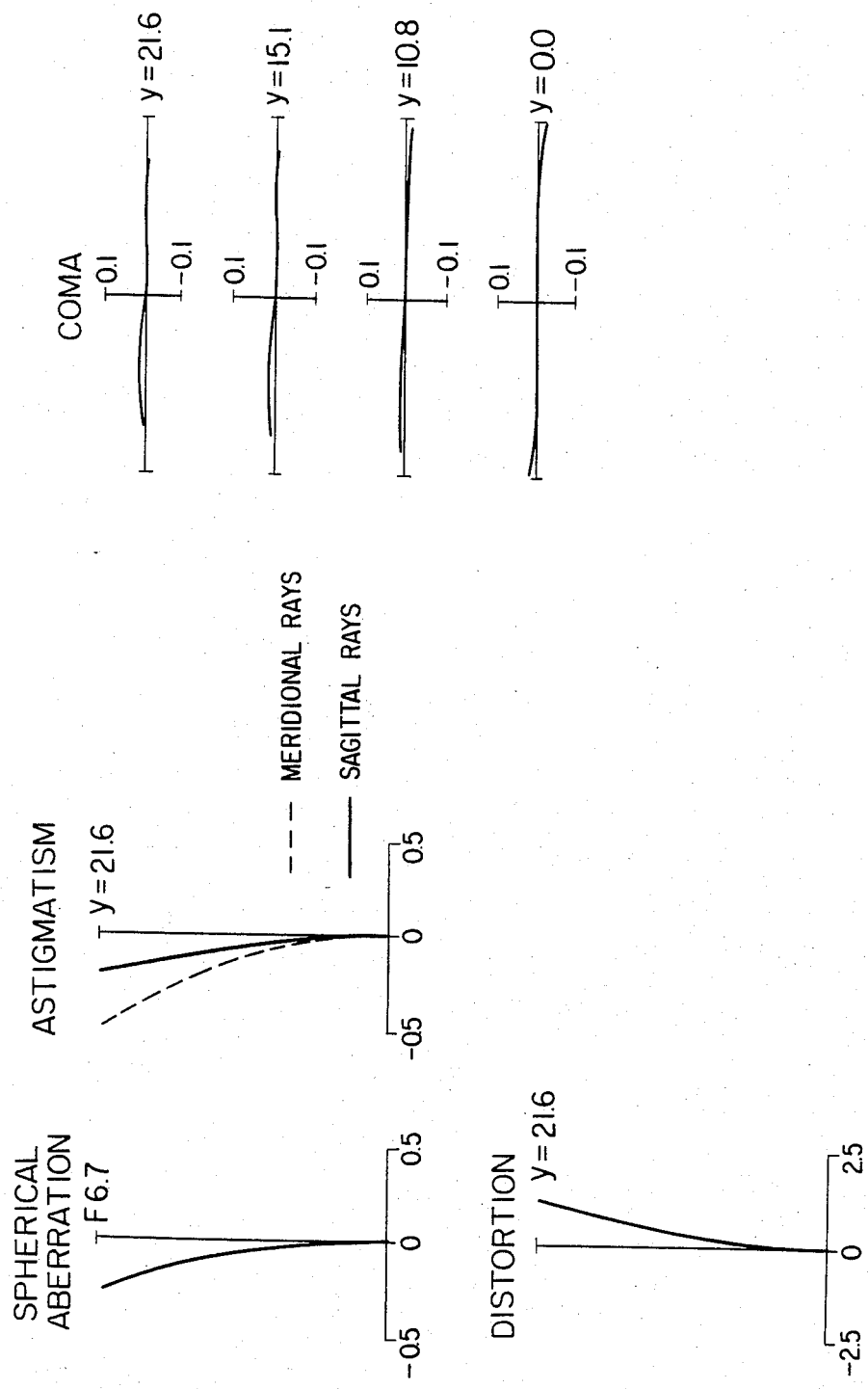
FIGS. 3A and 3B are chaCrts showing aberrations of said first embodiment.
Figure 3B:
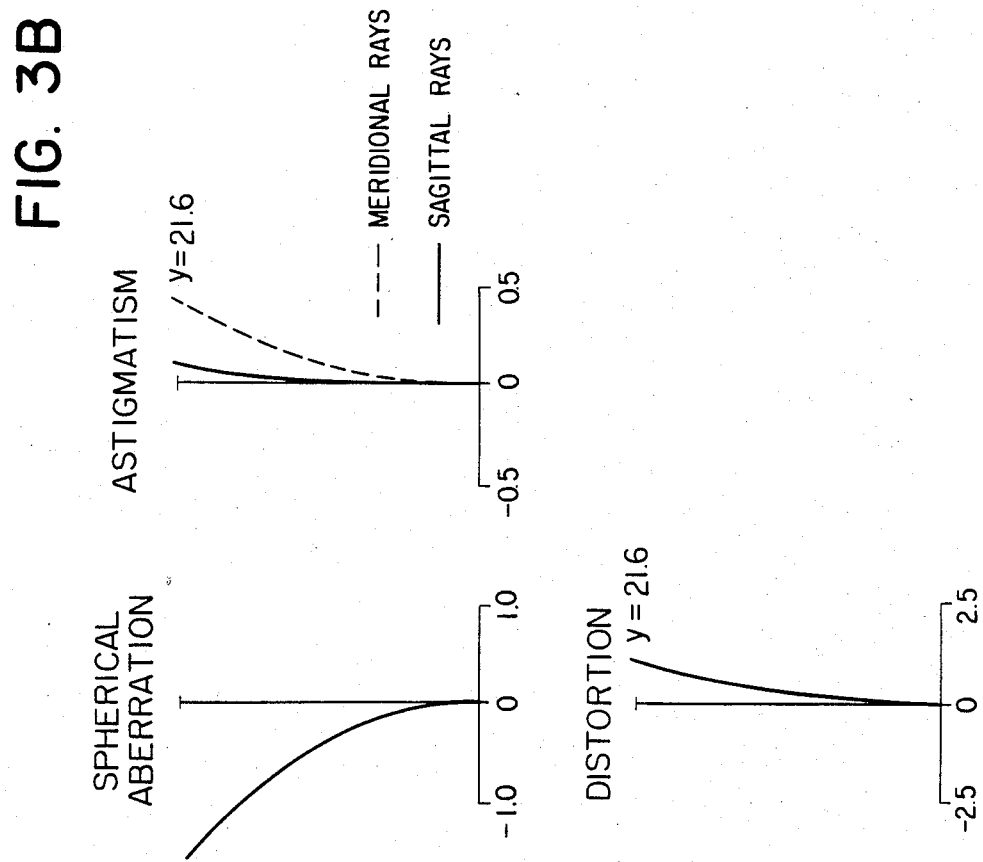
Figure 4A:
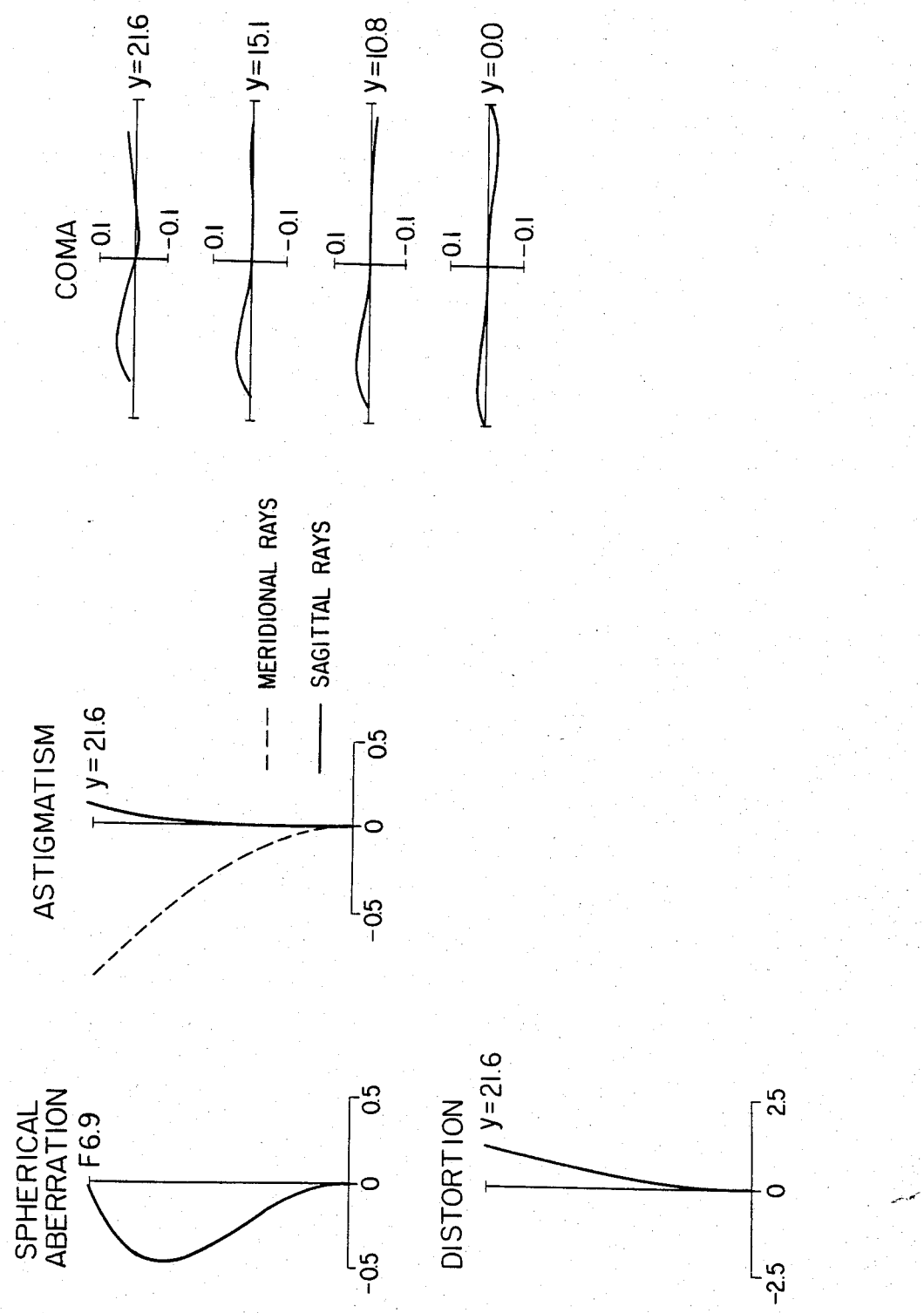
FIGS. 4A and 4B are charts showing aberrations of said second embodiment, wherein FIGS. 3A and 4A indicate a state in which the lens is focused to infinity while FIGS. 3B and 4B indicate a state in which the lens is focused to a shortest focusable distance.
Figure 4B:
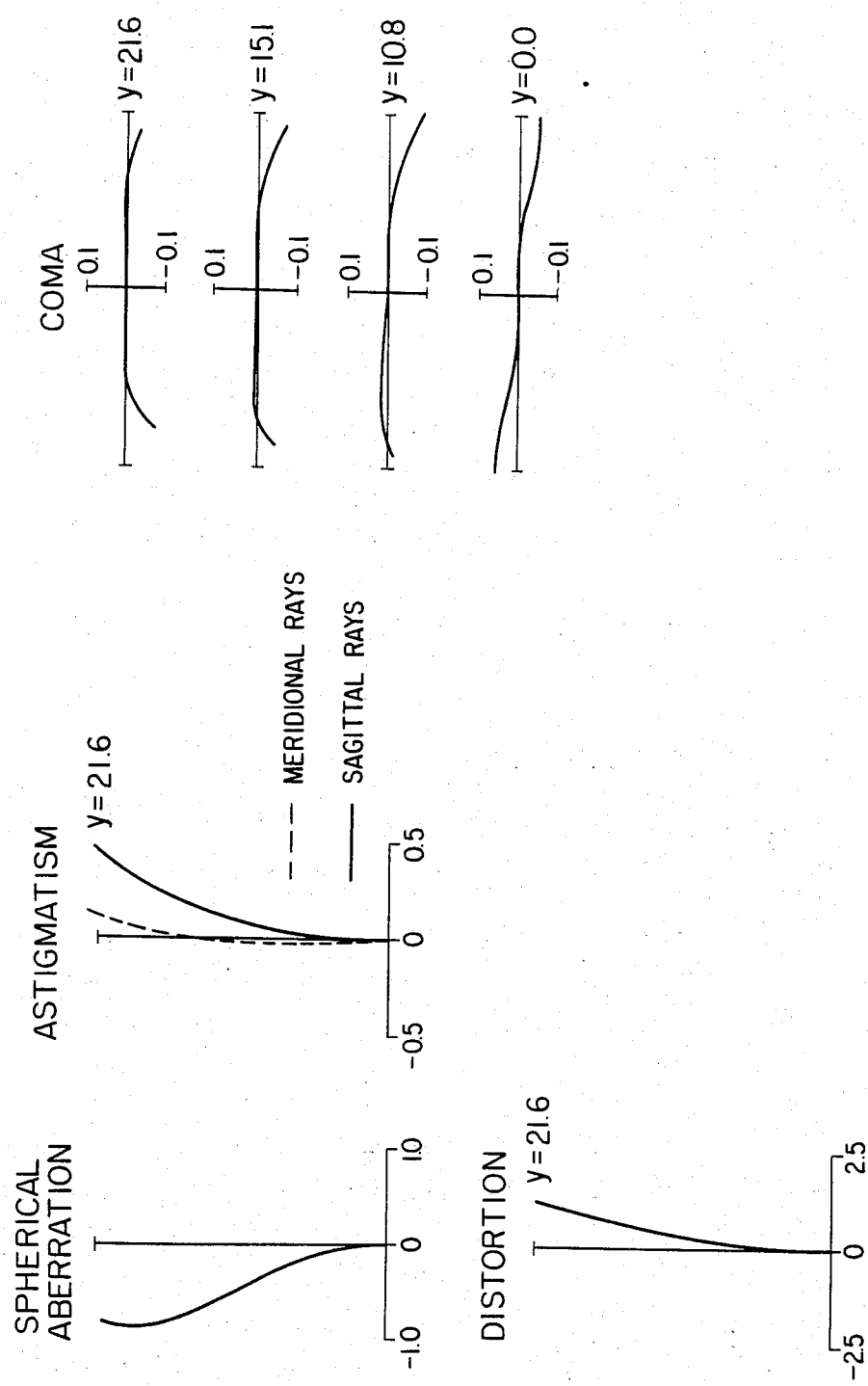

Now the present invention will be clarified in more detail by embodiments shown in FIGS. 1 and 2 respectively showing first and second embodiments of the present invention, wherein illustrated, for facilitating the understanding of the present invention, is a ray m emerging from an infinitely distant axial point and converging to a central point P where the optical axis Ax crosses the image plane I. Also the surfaces of the lenses are marked as R1, R2, R3, ... in the order of passage of the light beam.

The light beam converged by the biconvex positive lens component L1 reaches the first.reflecting member M1 functioning as the main mirror and positioned behind said biconvex positive lens component L1 with a large air gap therebetween. The first reflecting member M1 is provided with an entering surface R3, a rear reflecting surface R4 and an emerging surface R5, all meniscus shaped concave to the object side. Though the entering surface R3 is identical with the emerging surface R5, they are encoded differently according to the traveling of the light beam as they perform different functions on the light. The first reflecting member M1 causes the light, by refraction and reflection, to again pass the space to the biconvex positive lens component L1 and exhibits a converging effect stronger than that of the biconvex positive lens component L1. The light beam reflected by the first reflecting member M1 is guided to the second reflecting member M2 positioned close to and at the image side of the biconvex positive lens component L1 and functioning as the subsidiary mirror. The second reflecting member M2 is provided with an entering surface R6, a rear reflecting surface R7 and an emerging surface R8, all meniscus shaped and convex to the image side. The entering surface R6 is the same as the emerging surface R8, but they are named differently according to the proceeding of the light beam as they perform different functions on the light. The second reflecting member M2 diverges the light beam by reflection and refraction, and directs the light, which has been directed toward the object side by the first reflecting member M1, again toward the image side. The light beam reflected by the second reflecting member M2 functioning as the subsidiary mirror then reaches the negative lens group L2 positioned on the optical axis in the vicinity of the first reflecting member M1. Said negative lens group L2 is provided at least with a negative lens and a positive lens having a negative synthesized refractive power, thus diverging the light beam, like the second reflecting member M2.

Focusing to an object at a short distance is achieved by integrally displacing the biconvex positive lens component L1 and the second reflecting member M2.

In the following there will be explained technical features of the basic structure of the present invention explained above.

The first feature is that the positive lens constituting the frontmost component of the lens system has a biconvex shape, in contrast to the conventional frontmost lens component which is generally a meniscus lens convex to the object side. The positive lens component L1 has to be of a biconvex shape in order to minimize the variations of aberration to an object at a short distance, thus enabling focusing to a considerably short distance by displacement toward the object side together with the subsidiary mirror.

The second feature is that the first reflecting member M1, functioning as the main mirror, is composed of a meniscus-shaped concave rear-reflecting mirror, and the third feature is that the second reflecting member M2, functioning as the subsidiary mirror, is composed of a meniscus-shaped convex rear-reflecting mirror convex to the image side. These reflecting members have certain aberration correcting effects as the emerging surface generates aberrations inverse to those generated at the entering surface, and particularly the first reflecting member M1 shows small remaining aberrations because of the above-described structure though it has a stronger converging power than in the biconvex positive lens component L1. In addition, well-balanced aberrations are obtained in the entire lens system as the remaining aberrations in the first reflecting member M1 are cancelled by the aberrations of the second reflecting member M2. The relationship of aberrations of said first and second reflecting members M1, M2 will be understood from the third-order aberration coefficients in the first and second embodiments shown in Tables 3 and 4. In the main mirror or the first reflecting member M1, all the aberration coefficients at the entering surface R3 are large in value and opposite in sign to those of the reflecting surface R4 and emerging surface R5, so that these surfaces have a mutually cancelling effect. Also the aberrations are mutually cancelled at the surfaces of the second reflecting member M2. Also it will be understood, for example with respect to the spherical aberration coefficient I, that a negative value remaining in the first reflecting member M1 is compensated by a positive value remaining in the second reflecting member M2.

The fourth feature is that the negative lens group L2 contains at least a negative lens and a positive lens for principally correcting the image angle dependent aberrations. This fact will also be understood from the third-order aberration coefficients to be explained later. In the negative lens group L2, the coefficients of aberrations increase in the order of astigmatism III, curvature of image plane IV and distortion V and are larger than in any other component, thus indicating that said negative lens group L2 has an important role in the correction of the angle dependent aberrations.

In the above-explained structure of aberrations according to the present invention, the following conditions are required in order to achieve satisfactory aberration correction in the entire system and to maintain satisfactory performance even to an object at a short distance:

$$-0.2 < Q1 < 0.5 \quad (1)$$

$$3.8 < Q2 < 4.6 \quad (2)$$

$$-5.0 < Q3 < -3.3 \quad (3)$$

wherein Q1, Q2, Q3 are the shape factors respectively of the biconvex positive lens component L1, first reflecting member M1 and second reflecting member M2. Said shape factors are defined by:

$$Q1 = (R2 + R1)/(R2 - R1)$$

$$Q2 = (R4 + R3)/(R4 - R3)$$

$$Q3 = (R8 + R7)/(R8 - R7)$$

wherein R1 and R2 are radii of curvature respectively at the object side and image side of the biconvex positive lens component L1, R3 and R4 are radii of curvature respectively at the object side and image side of the first reflecting member M1, and R7 and R8 are radii of curvature respectively at the object side and image side of the second reflecting member M2.

The condition (1) defines the shape of the biconvex positive lens component L1 and is effective for compensating the change in the spherical aberration at a short distance while maintaining well-balanced aberrations at the infinite distance. Above the upper limit of the condition (1), the spherical aberration and the curvature of image plane become excessively large in the positive direction. An opposite tendency appears below the lower limit, and it becomes difficult to satisfactorily correct the aberrations at infinite and short distances.

The condition (2) defines the shape of the first reflecting member M1, which significantly influences the aberrations, particularly the spherical aberration. Consequently, even a slight change in the shape gives rise to significant changes in the aberrations, and the shape has to be considered not only in the first reflecting member M1 itself but also in relation to the second reflecting member M2 according to the condition (3). The spherical aberration and the curvature of image plane become excessively large in the negative direction or in the positive direction respectively above the upper limit or below the lower limit of the condition (2), and satisfactory correction is difficult to achieve in either case.

In contrast to the strong converging power of the first reflecting member M1, the second reflecting member M2 exerts a strong diverging power with an important role in the structure of aberrations. The spherical aberration and the curvature of image plane become excessively large in the negative direction or in the positive direction, respectively above the upper limit of the condition (3) or below the lower limit, and satisfactory correction is difficult to achieve in either case.

The negative lens group L2, contributing principally to the correction of non-axial aberrations, is preferably composed of three lens components, i.e. a first negative lens L21, a second negative lens L22 and a positive lens L23 in the order from the object side. It is further preferred that the first negative lens L21 has a stronger curvature at the image side and the second negative lens L22 has a stronger curvature at the object side, and at least either one may be composed of cemented lenses. The positive lens L23 preferably has a meniscus shape convex to the object side.

The basic four components of the above-described catadioptric telephoto lens, i.e. the biconvex positive lens component L1, first reflecting member M1, second reflecting member M2 and negative lens group L2 should preferably satisfy the following conditions on the power distribution:

$$0.6 < f1/f < 1.3 \quad (4)$$

$$0.15 < f2/f < 0.3 \quad (5)$$

$$-0.2 < f3/f < -0.1 \quad (6)$$

$$-0.16 < f4/f < -0.06 \quad (7)$$

wherein f1, f2, f3, f4 are the focal lengths respectively of the biconvex positive lens component L1, first reflecting member M1, second reflecting member M2 and negative lens group L2, and f is the composite focal length of the entire system. The focal length for the biconvex positive lens component L1 and the negative lens group L2 is calculated in the ordinary manner as they are purely dioptric systems, but the focal length for the first and second reflecting members M1, M2, which are catadioptric systems, is calculated in consideration of the entering, reflecting and emerging surfaces.

The above-mentioned conditions define the basic structure of the components of the catadioptric telephoto lens of the present invention, and are desirable for minimizing the entire length while maintaining well-balanced aberrations in the entire system. The condition (4) defines the focal length of the biconvex positive lens component L1, and, above the upper limit, a compact structure is difficult to achieve since the amount of integral displacement of the biconvex positive lens component L1 and the second reflecting member M2 for focusing to the shortest focusable distance becomes too large. On the other hand, below the lower limit, it becomes difficult to compensate the change in the spherical aberration at a short distance. The conditions (5) and (6) respectively define the focal lengths of the first reflecting member M1 functioning as the main mirror, and the second reflecting member M2 functioning as the subsidiary mirror, and provide requirements for the main and subsidiary mirrors to maintain well-balanced corrections by mutual compensation of the aberrations. A state below the lower limit of the condition (5) and (6) a state above the upper limit of the condition (6) are favorable for compactness but are unable to sufficiently correct the remaining aberrations. On the other hand, a state above the upper limit of the condition (5) and a state below the lower limit of the condition (6) are favorable for the correction of aberrations but the compactness is difficult to achieve. The condition (7) defines the focal length of the negative lens group L2. A state above the upper limit is favorable for compactness of the entire system by reducing the so-called telephoto ratio (ratio of the distance from the frontmost lenssurface to the focal plane with respect to the focal length), but the aberrations generated in the lens system up to the second lens group L2 are accordingly increased, and the correction for the curvature of image plane becomes difficult to achieve because of an excessively large negative Petzval's sum. Below the lower limit there appear opposite tendencies, and it becomes difficult to maintain satisfactory imaging performance.

Preferred Embodiments

In the following there will be explained embodiments of the catadioptric telephoto lens of the present invention.

In a first embodiment shown in FIG. 1, the first reflecting member M1 has a central aperture, and the rear reflecting surface R4 is formed by silver or aluminum evaporation. The rear reflecting surface R7 of the second reflecting member M2 is also formed by silver or aluminum evaporation. The negative lens group L2 is positioned in the central aperture of the first reflecting member M1 and is composed of a single negative lens L21 with a strongly concave surface toward the image side, a single negative meniscus lens L22 concave to the object side, and a single positive meniscus lens L23 convex to the object side.

In a second embodiment shown in FIG. 2, the negative lens group L2 is formed without making an aperture in the first reflecting member M1, and is composed of a single negative meniscus lens L21 convex to the object side, a negative meniscus lens L22 consisting of a biconcave negative lens, a biconvex positive lens and a meniscus lens constituting the main mirror which are mutually adhered, and a single positive meniscus lens L23 convex to the object side. Said negative meniscus lens L22 is formed by adhering an adhered meniscus lens, which is composed of a biconcave negative lens and a biconvex positive lens and is convex to the image side, to the image side surface of the first reflecting member M1 on the optical axis. The absence of a central aperture in the first reflecting member M1 facilitates the manufacture, and the use of a cemented lens in the negative lens group L2 facilitates the correction of off-axial chromatic aberration. On the rear surface R4 of the first reflecting member M1, silver or aluminum is evaporated in an annular shape excluding the central area containing the optical axis.

The numeral data of the first and second embodiments are respectively shown in Tables 1 and 2, wherein the numbers in the left-hand column indicate the surfaces in the order of proceeding of light, and a same lens surface is indicated by different numbers if the light passes said lens surface plural times.

TABLE 1

First embodiment

Focal length: f = 499.482  Image angle: 2ω = 5°
F number: 6.7

| No. | Radius of curvature R | Central thickness/gap d | Refractive index n | Abbe's number ν | |
|---|---|---|---|---|---|
| 1 | 587.000 | 10.00 | 1.51680 | 64.12 | L1 |
| 2 | −587.300 | 56.00 | | | |
| 3 | −116.666 | 13.70 | 1.51680 | 64.12 | M1 |
| 4 | −192.743 | −13.70 | 1.51680 | 64.12 | |
| 5 | −116.666 | −48.50 | | | |
| 6 | −58.093 | −5.00 | 1.51680 | 64.12 | M2 |
| 7 | −99.328 | 5.00 | 1.51680 | 64.12 | |
| 8 | −58.093 | 41.50 | | | |
| 9 | 10206.648 | 3.00 | 1.51680 | 64.12 | L2 |
| 10 | 25.338 | 7.50 | | | |
| 11 | −29.450 | 4.50 | 1.51823 | 58.96 | |
| 12 | −41.602 | 0.50 | | | |
| 13 | 41.434 | 5.00 | 1.79631 | 40.96 | |
| 14 | 66.948 | 63.216 | | | |

Q1 = 0.0    f1/f = 1.141
Q2 = 4.067  f2/f = 0.256
Q3 = −3.818 f3/f = −0.174
            f4/f = −0.130

TABLE 2

Second embodiment

Focal length: f = 500.006  Image angle: 2ω = 5°
F number: 6.7

| No. | Radius of curvature R | Central thickness/gap d | Refractive index n | Abbe's number ν | |
|---|---|---|---|---|---|
| 1 | 405.400 | 9.50 | 1.51680 | 64.12 | L1 |
| 2 | −405.400 | 47.15 | | | |
| 3 | −103.600 | 11.00 | 1.51680 | 64.12 | M1 |
| 4 | −165.400 | −11.00 | 1.51680 | 64.12 | |
| 5 | −103.600 | −41.20 | | | |
| 6 | −59.500 | −3.00 | 1.51680 | 64.12 | M2 |
| 7 | −93.990 | 3.00 | 1.51680 | 64.12 | |
| 8 | −59.500 | 24.60 | | | |
| 9 | 45.920 | 1.80 | 1.75520 | 27.64 | L2 |
| 10 | 20.500 | 9.20 | | | |
| 11 | −41.819 | 0.95 | 1.77279 | 49.44 | |
| 12 | 32.200 | 4.65 | 1.78470 | 26.07 | |
| 13 | −103.600 | 11.00 | 1.51680 | 64.12 | |
| 14 | −165.400 | 0.30 | | | |
| 15 | 42.200 | 5.60 | 1.51680 | 64.12 | |
| 16 | 83.265 | 57.457 | | | |

Q1 = 0.0    f1/f = 0.788
Q2 = 4.353  f2/f = 0.214
Q3 = −4.450 f3/f = −0.142
            f4/f = −0.085

The lens of the first embodiment has a total length of 142.716 corresponding to 28.6% of the focal length of the entire system, while the lens of the second embodiment has a total length of 131.007 corresponding to only 26.2% of the entire focal length. In the first embodiment, focusing to a shortest focusable distance of 1500=3.0f is performed by integral displacement of the biconvex positive lens component L1 and the second reflecting member M2 by 8.05 toward the object side, and, in the second embodiment, focusing to a shortest focusable distance of 1500=3.0f is performed by a similar integral displacement of 5.09 toward the object side.

The third-order aberration coefficients in said first and second embodiments are shown in Tables 3 and 4, wherein I, II, III, IV and V respectively indicate the third-order aberration coefficients for the spherical aberration, coma, astigmatism, sagittal curvature of image plane and distortion. The numbers at the left-end column indicate the lens surfaces in the order of proceeding of light, and Σ indicates the sum in the entire system.

TABLE 3

Third-order aberration coefficients of first embodiment

| | | I | II | III | IV | V |
|---|---|---|---|---|---|---|
| L1 | 1 | 0.138 | 0.087 | 0.055 | 0.345 | 0.217 |
| | 2 | 2.021 | −2.257 | 2.521 | 2.811 | −3.140 |
| M1 | 3 | −26.999 | 17.385 | −11.194 | −12.653 | 8.147 |
| | 4 | 17.836 | −14.674 | 12.072 | 8.655 | −7.121 |
| | 5 | 0.997 | −1.793 | 3.227 | 1.769 | −3.183 |
| M2 | 6 | −0.634 | 1.695 | −4.532 | −1.603 | 4.286 |
| | 7 | −9.150 | 7.789 | −6.631 | 0.000 | 0.000 |
| | 8 | 17.929 | −9.076 | 4.594 | 7.524 | −3.808 |
| L2 | 9 | −0.998 | 1.246 | −1.556 | −1.539 | 1.922 |
| | 10 | −0.135 | −0.683 | −3.453 | −10.169 | −51.388 |
| | 11 | −1.189 | −0.147 | −0.018 | −5.808 | −0.720 |
| | 12 | 0.369 | −0.229 | 0.142 | 4.240 | −2.630 |
| | 13 | 0.020 | 0.177 | 1.604 | 6.947 | 62.887 |
| | 14 | 0.000 | −0.025 | 3.447 | 0.140 | −19.333 |
| Σ | | 0.204 | −0.505 | 0.278 | 0.659 | −13.863 |

TABLE 4

Third-order aberration coefficients of second embodiment

| | | I | II | III | IV | V |
|---|---|---|---|---|---|---|
| L1 | 1 | 0.421 | 0.130 | 0.040 | 0.461 | 0.143 |
| | 2 | 6.121 | −5.466 | 4.881 | 5.301 | −4.734 |
| M1 | 3 | −43.569 | 25.657 | −15.109 | −16.753 | 9.865 |
| | 4 | 31.085 | −22.349 | 16.753 | 12.083 | −8.687 |
| | 5 | 3.734 | −4.461 | 5.331 | 3.686 | −4.404 |
| M2 | 6 | −4.455 | 5.621 | −7.091 | −4.228 | 5.334 |
| | 7 | −12.616 | 9.407 | −7.015 | 0.000 | 0.000 |
| | 8 | 22.392 | −11.851 | 6.272 | 9.135 | −4.835 |
| L2 | 9 | −0.343 | 1.451 | −6.145 | −1.460 | 6.183 |
| | 10 | 0.014 | 0.049 | 0.178 | −10.316 | −37.462 |
| | 11 | −1.632 | 0.949 | −0.552 | −5.764 | 3.351 |
| | 12 | 0.011 | 0.045 | 0.187 | 0.246 | 1.029 |
| | 13 | 0.024 | −0.081 | 0.271 | 0.749 | −2.503 |
| | 14 | 0.050 | −0.250 | 1.263 | 2.293 | −11.584 |
| | 15 | −0.000 | −0.002 | −0.029 | 4.008 | 48.977 |
| | 16 | 0.005 | −0.110 | 2.686 | 0.640 | −15.581 |
| Σ | | 1.242 | −1.262 | 1.237 | 0.080 | −14.908 |

Various aberrations of the first and second embodiments are respectively shown in FIGS. 3A and 3B and FIGS. 4A and 4B, wherein A and B respectively indicate the aberrations when the lens is focused to infinity or to the shortest distance. These figures indicate the spherical aberration, astigmatism, distortion and coma for the light of d line (λ=587.6 nm).

From the foregoing tables and charts of aberrations it will be understood that the first and second embodiments have excellent imaging performance both at the infinite distance and at the shortest distance.

As explained in the foregoing, the present invention provides a catadioptric telephoto lens which is small and light with an entire length from the frontmost lens surface to the focal plane as short as 26% of the focal length, and is featured by a sturdy structure free from ghost light, and which still shows an excellent imaging performance and a reduced shortest focusable distance.

What is claimed is:

1. A catadioptric telephoto lens comprising, in the order of proceeding of light from the object side:
   a biconvex positive lens component;
   a first reflecting member having a refracting surface concave to the object side and a rear reflecting surface also concave to the object side and capable of reflecting and converging the light;

a second reflecting member positioned close to and at the image side of said biconvex positive lens component and having a refracting surface convex to the image side and a rear reflective surface also convex to the image side and capable of reflecting and diverging the light; and a negative lens group positioned close to said first reflecting member and having at least a positive lens and a negative lens with a synthesized negative refractive power;

said biconvex positive lens component and said second reflecting member being integrally movable along an optcial axis of the telephoto lens for focusing to an object;

said telephoto lens satisfying the following conditions:

$$-0.2 < Q1 < 0.5 \quad (1)$$

$$3.8 < Q2 < 4.6 \quad (2)$$

$$-5.0 < Q3 < -3.3 \quad (3)$$

wherein Q1, Q2 and Q3 are shape factors respectively of said biconvex positive lens component, said first reflecting member and said second reflecting member and are defined by:

$$Q1 = (R2+R1)/(R2-R1)$$

$$Q2 = (R4+R3)/(R4-R3)$$

$$Q3 = (R8+R7)/(R8-R7)$$

wherein R1 and R2 are radii of curvature respectively at the object side and at the image side of the biconvex positive lens component, R3 and R4 are radii of curvature respective at the object side and at the image side of the first reflecting member, and R7 and R8 are radii of curvature respectively at the object side and at the image side of the second reflecting member, and further satisfying the following conditions:

$$0.6 < f1/f < 1.3 \quad (4)$$

$$0.15 < f2/f < 0.3 \quad (5)$$

$$-0.2 < f3/f < -0.1 \quad (6)$$

$$-0.16 < f4/f < -0.06 \quad (7)$$

wherein f1, f2, f3 and f4 are focal lengths respectively of the biconvex positive lens component, first reflecting member, second reflecting member and negative lens group and f is the composite focal length of the entire telephoto lens.

2. A catadioptric telephoto lens according to claim 1, wherein said negative lens group comprises, in the order from the object side, a negative lens with its surface of stronger curvature at the image side, a negative meniscus lens convex to the image side, and a positive meniscus lens convex to the object side.

3. A catadioptric telephoto lens according to claim 2, having the following numerical data:

Focal length: f = 499.482   Image angle: 2ω = 5°
F number: 6.7

| No. | Radius of curvature R | Axial thickness/gap d | Refractive index n | Abbe's number ν | |
|---|---|---|---|---|---|
| 1 | 587.000 | 10.00 | 1.51680 | 64.12 | L1 |
| 2 | −587.300 | 56.00 | | | |
| 3 | −116.666 | 13.70 | 1.51680 | 64.12 | M1 |
| 4 | −192.743 | −13.70 | 1.51680 | 64.12 | |
| 5 | −116.666 | −48.50 | | | |
| 6 | −58.093 | −5.00 | 1.51680 | 64.12 | M2 |
| 7 | −99.328 | 5.00 | 1.51680 | 64.12 | |
| 8 | −58.093 | 41.50 | | | |
| 9 | 10206.648 | 3.00 | 1.51680 | 64.12 | L2 |
| 10 | 25.338 | 7.50 | | | |
| 11 | −29.450 | 4.50 | 1.51823 | 58.96 | |
| 12 | −41.602 | 0.50 | | | |
| 13 | 41.434 | 5.00 | 1.79631 | 40.96 | |
| 14 | 66.948 | 63.216 | | | |

Q1 = 0.0   f1/f = 1.141
Q2 = 4.067   f2/f = 0.256
Q3 = −3.818   f3/f = −0.174
              f4/f = −0.130 wherein the numbers in the left-hand column indicate the surfaces in the order of proceeding of light, and a same lens surface is indicated by different numbers if the light passes said sufface again.

4. A catadioptric telephoto lens according to claim 1, wherein said negative lens group comprises, in the order from the object side, a negative meniscus lens convex to the object side, an adhered meniscus lens cemented on the optical axis on a surface at the object side of said first reflecting member and convex to the image side, and a positive meniscus lens convex to the object side.

5. A catadioptric telephoto lens according to claim 4, having the following numerical data:

Focal length: f = 500.006   Image angle: 2ω = 5°
F number: 6.7

| No. | Radius of curvature R | Axial thickness/gap d | Refractive index n | Abbe's number ν | |
|---|---|---|---|---|---|
| 1 | 405.400 | 9.50 | 1.51680 | 64.12 | L1 |
| 2 | −405.400 | 47.15 | | | |
| 3 | −103.600 | 11.00 | 1.51680 | 64.12 | M1 |
| 4 | −165.400 | −11.00 | 1.51680 | 64.12 | |
| 5 | −103.600 | −41.20 | | | |
| 6 | −59.500 | −3.00 | 1.51680 | 64.12 | M2 |
| 7 | −93.990 | 3.00 | 1.51680 | 64.12 | |
| 8 | −59.500 | 24.60 | | | |
| 9 | 45.920 | 1.80 | 1.75520 | 27.64 | L2 |
| 10 | 20.500 | 9.20 | | | |
| 11 | −41.819 | 0.95 | 1.77279 | 49.44 | |
| 12 | 32.200 | 4.65 | 1.78470 | 26.07 | |
| 13 | −103.600 | 11.00 | 1.51680 | 64.12 | |
| 14 | −165.400 | 0.30 | | | |
| 15 | 42.200 | 5.60 | 1.51680 | 64.12 | |
| 16 | 83.265 | 57.457 | | | |

Q1 = 0.0   f1/f = 0.788
Q2 = 4.353   f2/f = 0.214
Q3 = −4.450   f3/f = −0.142
              f4/f = −0.085 wherein the numbers in the left-end column indicate the surfaces in the order of proceeding of light, and a same lens surface is indicated by different numbers if the light passes said surface again.

6. A catadioptric telephoto lens comprising:
a biconvex positive lens component;
a first reflecting member disposed at the image side of said biconvex positive lens component for reflecting and converging light from said biconvex positive lens component;

a second reflecting member disposed member disposed close to and at the image side of said biconvex positive lens component and having a convex reflecting surface for reflecting the light from said first reflecting member; and a negative lens group disposed close to said first reflecting member for directing the light from said second reflecting member toward a predetermined image plane;

said biconvex positive lens component and said second reflecting member being integrally movable along an optical axis of said telephoto lens for focusing to an object, wherein said catadioptric telephoto lens satisfies the following conditions:

$$-0.2 < Q1 < 0.5$$

$$0.15 < f2/f < 0.3$$

$$-0.2 < f3/f < -0.1$$

$$-0.16 < f4/f < -0.06$$

wherein Q1 is a shape factor of said biconvex positive lens component defined by $Q1=(R2+R1)/(R2-R1)$ where R1 and R2 are radii of curvature respectively at the object side and at the image side of the biconvex positive lens component, f2, f3 and f4 are focal lengths respectively of the first reflecting member, the second reflecting member and the negative lens group, and f is the composite focal length of the entire telephoto lens.

7. A catadioptric telephoto lens according to claim 6, further satisfying the following conditions:

$$3.8 < Q2 < 4.6$$

$$-5.0 < Q3 < -3.3$$

where Q2 and Q3 are shape factors respectively of said first reflecting member and said second reflecting member and are defined by:

$$Q2=(R4+R3)/(R4-R3)$$

$$Q3=(R8+R7)/(R8-R7)$$

where R3 and R4 are radii of curvature respectively at the object side and at the image side of the first reflecting member, and R7 and R8 are radii of curvature respectively at the object side and at the image side of the second reflecting member.

8. A catadioptric telephoto lens according to claim 6, further satisfying the following condition:

$$0.6 < f1/f < 1.3$$

wherein f1 is the focal length of the biconvex positive lens component.

9. A catadioptric telephoto lens according to claim 6, wherein said negative lens group comprises, in the order from the object side, a negative lens with its surface of stronger curvature at the image side, a negative meniscus lens convex to the imge side, and a positive meniscus lens convex to the object side.

10. A catadioptric telephoto lens according to claim 6, wherein said first reflecting member has an outer concave refractive surface and an inner concave reflective surface.

11. A catadioptric telephoto lens according to claim 10, wherein said second reflecting member has an outer convex refractive surface and an inner convex reflective surface.

12. A catadioptric telephoto lens comprising, a biconvex positive lens component;

a first reflecting member disposed at the image side of said biconvex positive lens component for reflecting and converging light from said biconvex positive lens component;

a second reflecting member disposed close to and at the image side of said biconvex positive lens component and having a convex reflecting surface for reflecting the light from said first reflecting member; and a negative lens group disposed close to said first reflecting member for directing the light from said second reflecting member toward a predetermined image plane, said negative lens group including, in the order from the object side, a negative lens with its surface of sharper curvature at the image side, a negative meniscus lens convex to the image side and a positive meniscus lens convex to the object side, said biconvex positive lens component and said second reflecting member being integrally movable along an optical axis of the telephoto lens for focusing to an object.

13. A catadioptric telephoto lens according to claim 12, wherein said first reflecting member has an outer concave refractive surface and an inner reflective surface, and said second reflecting member has an outer convex refractive surfaee and an inner reflective surface.

* * * * *